Feb. 8, 1927.  
H. A. JONES  
1,616,806  
TUBE VALVE  
Filed Jan. 16, 1926

Henry A. Jones  
INVENTOR  
BY Victor J. Evans  
ATTORNEY

/ Patented Feb. 8, 1927.

1,616,806

UNITED STATES PATENT OFFICE.

HENRY A. JONES, OF LILBOURN, MISSOURI.

TUBE VALVE.

Application filed January 16, 1926. Serial No. 81,777.

This invention relates to improvements in tire valves, the general object of the invention being to provide means for preventing the escape of air through the valve by providing a number of valves through all of which the air must pass in order to escape.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
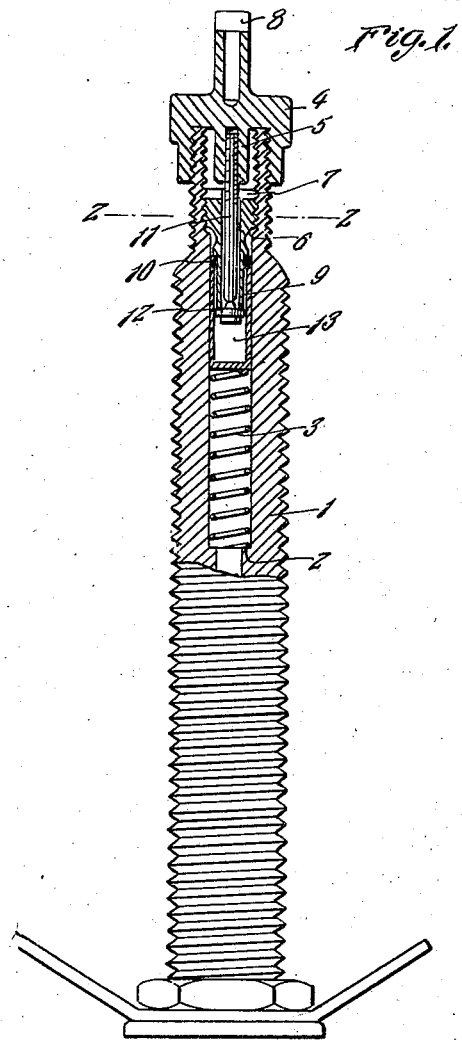
Figure 1 is a sectional view through a valve casing, showing the invention in use.
Figure 3:
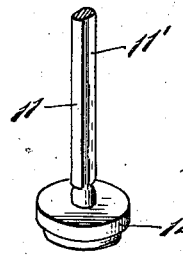
Figure 3 is a view showing the main valve and its stem.
Figure 2:
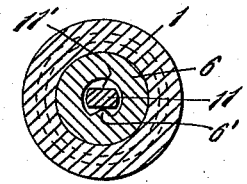
Figure 2 is a section on line 2—2 of Figure 1.

In these views, 1 indicates the valve casing which is formed with the shoulder 2 for receiving the lower end of the spring 3 and which is threaded internally and externally. The external threads receive the cap 4 which is provided with a depending central part 5 having a threaded bore. A tubular member 6 has an enlarged threaded part to engage the internal threads of the casing, and this part is provided with the notches 7 for receiving the projections 8 of the cap, so that it can be screwed into or out of the casing.

The tubular member 6 is formed with a lower cylindrical reduced portion 9 which forms an annular shoulder at the inner end of the reduced portion upon which is arranged an expansible gasket 10. A stem 11 carries a valve disk 12 which is adapted to engage the end of the cylindrical part 9 to close the same when the cap 4 is screwed home upon the casing 1 as the threaded upper part of the stem 11 will engage the threaded bore of the part 5 so that the stem 11 is moved upwardly and thus the valve 12 will tightly engage the inner end of the part 9. A cylinder 13 has its open part surrounding the part 9 of member 6, and its closed lower end is engaged by the spring 3 which forces its open end against the gasket 10. It will be noted that the spring pressing upwardly on the cylindrical member 13 will cause the upper end of this cylindrical member to bear against the gasket 10 and force the same against the shoulder formed on the tubular member 6 to prevent leakage around the tubular member at this point.

From the foregoing, it will be seen that when the cap 4 is screwed tight, the stem 11 will move upwardly so that the disk 12 is pressed tightly against the end of the part 9 to close the same, and this action will expand the disk 12 against the inner walls of the cylinder 13 to make a tight joint with said cylinder and the spring, forcing the cylinder 13 against the gasket 10, will make a tight joint at this point.

Thus the various valves will insure an air-tight closure for the valve casing, which renders it impossible for any air to escape from the tire even though one of the valve parts should leak.

The part 6 has a nipple 6' thereon for engaging a flat part 11' of the stem 11 to prevent rotary movement of the stem.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a valve casing, a tubular member therein having a reduced cylindrical part, a shoulder at the junction of the cylindrical part with the main part, a gasket seated upon said shoulder, a cylinder enclosing the cylindrical part and having its open end engaging the gasket, a spring in the valve casing pressing the cylinder against the gasket, a valve stem passing through the tubular member, a valve part at its lower end engaging the open end of the cylindrical part, a cap for the valve casing and means thereon engaging the valve stem for expanding its valve part against the inner walls of the cylinder.

In testimony whereof I affix my signature.

HENRY A. JONES.